US011748162B2

(12) United States Patent
Fong et al.

(10) Patent No.: US 11,748,162 B2
(45) Date of Patent: Sep. 5, 2023

(54) FUNCTION EXECUTION ENVIRONMENT SELECTION FOR DECOMPOSED APPLICATION

(71) Applicant: EMC IP Holding Company LLC, Hopkinton, MA (US)

(72) Inventors: Victor Fong, Medford, MA (US); Xuebin He, Westwood, MA (US); James R. King, Norwood, MA (US); Alex Robbins, Mansfield, MA (US); Kenneth Durazzo, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 342 days.

(21) Appl. No.: 16/735,195

(22) Filed: Jan. 6, 2020

(65) Prior Publication Data
US 2021/0208941 A1     Jul. 8, 2021

(51) Int. Cl.
*G06F 9/50*       (2006.01)
*G06F 9/455*      (2018.01)

(52) U.S. Cl.
CPC ........ *G06F 9/5027* (2013.01); *G06F 9/45558* (2013.01); *G06F 2009/45595* (2013.01)

(58) Field of Classification Search
CPC ............... G06F 9/5027; G06F 9/45558; G06F 2009/45595; G06F 11/302; G06F 11/3688; G06F 16/88
USPC ......................................................... 718/1
See application file for complete search history.

(56) References Cited

U.S. PATENT DOCUMENTS 10,831,458 B2 * 11/2020 Sunarno .................... G06F 8/60
2004/0078785 A1 * 4/2004 Dutt ....................... G06F 8/445
                                                        717/136
(Continued)

FOREIGN PATENT DOCUMENTS

CN       103218269 B   * 10/2015

OTHER PUBLICATIONS

Aditya et al., "Will Serverless Computing Revolutionize NFV?", Apr. 2019, Proceedings of the IEEE, Vo. 107, No. 4, pp. 667-678. (Year: 2019).*

(Continued)

*Primary Examiner* — Kenneth Tang
(74) *Attorney, Agent, or Firm* — Ryan, Mason & Lewis, LLP

(57) ABSTRACT

Techniques for function execution environment selection for a decomposed application are provided. In one example, an apparatus comprises at least one processing platform configured to execute a portion of an application program in a first virtual computing element, wherein the application program comprises one or more portions of marked code, receive a request for execution of one of the one or more portions of marked code, decide whether to execute the portion of marked code identified in the request in the first virtual computing element or in a second virtual computing element, determine an execution environment from one or more execution environments specified in the marked code for the second virtual computing element to execute the marked code, when it is decided to execute the portion of the marked code in the second virtual computing element, and cause the portion of marked code identified in the request to be executed.

16 Claims, 8 Drawing Sheets

(56) References Cited

U.S. PATENT DOCUMENTS

| | | | | |
|---|---|---|---|---|
| 2011/0289507 A1* | 11/2011 | Khan | .................... | G06F 9/5094 |
| | | | | 718/100 |
| 2014/0115596 A1* | 4/2014 | Khan | ........................ | G06F 9/50 |
| | | | | 718/104 |
| 2017/0366551 A1* | 12/2017 | Brandwine | ............ | H04L 63/102 |
| 2018/0157568 A1* | 6/2018 | Wagner | ................. | G06F 9/5077 |
| 2019/0028552 A1* | 1/2019 | Johnson, II | ............ | H04L 67/146 |
| 2019/0363905 A1* | 11/2019 | Yarvis | ..................... | H04L 67/60 |
| 2019/0377604 A1* | 12/2019 | Cybulski | ............... | G06F 9/5072 |
| 2021/0263779 A1* | 8/2021 | Haghighat | .......... | G06F 11/3409 |

OTHER PUBLICATIONS

Wikipedia, "Platform as a Service," https://en.wikipedia.org/wiki/Platform_as_a_service, Nov. 20, 2019, 6 pages.

Wikipedia, "Function as a Service," https://en.wikipedia.org/wiki/Function_as_a_service, Dec. 5, 2019, 2 pages.

Wikipedia, "OS-Level Virtualization," https://en.wikipedia.org/wiki/OS-level_virtualization, Dec. 11, 2019, 5 pages.

Wikipedia, "AspectJ," https://en.wikipedia.org/wiki/AspectJ, Dec. 18, 2019, 4 pages.

Wikipedia, "Kubernetes," https://en.wikipedia.org/wiki/Kubernetes, Dec. 28, 2019, 12 pages.

Wikipedia, "Node.js," https://en.wikipedia.org/wiki/Node.js, Dec. 29, 2019, 11 pages.

Google Cloud, "Knative," https://cloud.google.com/knative/, 2019, 8 pages.

U.S. Appl. No. 16/668,676 filed in the name of Xuebin He et al. on Oct. 30, 2019 and entitled "Dynamic Application Decomposition for Execution in a Computing Environment."

* cited by examiner

```
module.exports = {
    function1 : function (arg1, arg2) {
        . . .
    },
    function2 : function (arg1) {
        . . .
    }
}
```

```
const marked_function = require ('function_wrapper')

module.exports = {
   function1 : marked_function ('my-functions1', function (arg1, arg2) {
      . . .
   } ),
   function2 : function (arg1) {
      . . .
   }
}
```

FIG. 6A
602

`node deployment-descriptor-transformation.js <original knative service file> <root directory> <output file>`

FIG. 6B
604

`node deployment-descriptor-transformation.js sample/service.yml sample/ sample/func-services.yaml`

FIG. 6C
606

```
kubectl apply -f service.yml
kubectl apply -f func-services.yml
```

FIG. 6D
608

```
@Marked_function ("say-hello")
public String sayHello (String name1, String name2) {
    ...
}
```

FIG. 6E
610

`node deployment-descriptor-transformation.js ../sample/service.yml ../sample ../sample/func-services.yaml com.example.helloworld`

FIG. 7A
702

```
//go : generate marked_function hello-world memory-optimized
func helloWorld() {}
```

FIG. 7B
704

```
//go : generate marked_function hello-world compute-optimized, memory-optimized, general-purpose
func helloWorld() {}
```

800

902

| VM TYPE | LABEL |
|---|---|
| T2.2xLARGE | GENERAL-PURPOSE |
| C5.24xLARGE | COMPUTE-OPTIMIZED |
| R4.16xLARGE | MEMORY-OPTIMIZED |
| I3.METAL | NETWORK-OPTIMIZED |
| G3.16xLARGE | ACCELERATOR-OPTIMIZED |

904

| HARDWARE | LABEL |
|---|---|
| POWER EDGE R7425 | GENERAL-PURPOSE |
| POWER EDGE R940xa WITH 112 CORES | COMPUTE-OPTIMIZED |
| POWER EDGE R840 WITH 4 NVIDIA GPUs | ACCELERATOR-OPTIMIZED |
| POWER EDGE R740xd2 WITH POWER MAX 8000 | MEMORY-OPTIMIZED |

FUNCTION EXECUTION ENVIRONMENT SELECTION FOR DECOMPOSED APPLICATION

FIELD

The field relates generally to computing environments, and more particularly to techniques for function execution environment selection for a decomposed application in such computing environments.

BACKGROUND

Decomposing a software application program (application) into jobs or functions that execute in a computing environment is very time consuming and takes a lot of manual work. Such computing environments may include cloud computing services including Platform-as-a-Service (PaaS) or Function-as-a-Service (FaaS). PaaS is a computing service implemented in a cloud computing environment in which a third-party provider (PaaS provider) provides hardware and software tools (hosted on the PaaS provider infrastructure) to enable a user to develop and manage an application. Thus, the user develops and manages the application and the service platform is managed by the PaaS provider. In contrast, FaaS is a computing service implemented in a cloud computing environment in which a third-party provider (FaaS provider) provides hardware and software tools (hosted on the FaaS provider infrastructure) to enable a user to develop and manage application functions without the complexities of developing and deploying a monolithic application. Thus, the user develops and manages the application functions and the service platform is managed by the FaaS provider.

For example, decomposing an application involves refactoring on both application code and the test suite, as well as creating separate container images and deployment manifests if the functions service does not support raw code compilation. After the application is refactored into jobs or functions, it is still quite difficult to maintain, as there could be tens of jobs and hundreds of functions for a typical application, making long-term maintenance difficult and cost heavy.

Furthermore, once an application is decomposed into functions, the decision of which execution environment a given function is assigned for execution is at the discretion of the PaaS or FaaS system being used.

SUMMARY

Embodiments of the invention provide techniques for function execution environment selection for a decomposed application in a computing environment.

For example, in one embodiment, an apparatus comprises at least one processing platform comprising one or more processing devices. The at least one processing platform is configured to execute a portion of an application program in a first virtual computing element, wherein the application program comprises one or more portions of marked code, receive a request for execution of one of the one or more portions of marked code, decide whether to execute the portion of marked code identified in the request in the first virtual computing element or in a second virtual computing element, determine an execution environment from one or more execution environments specified in the marked code for the second virtual computing element to execute the marked code, when it is decided to execute the portion of the marked code in the second virtual computing element, and cause the portion of marked code identified in the request to be executed.

Advantageously, illustrative embodiments provide for the addition of environment selection information into code markers that are used to specify function spawns. Thus, by way of example, a function marker is used to mark the function as being able to be broken out and run in its own container, and also to trigger selection of the type of execution environment the function should be run in.

While some embodiments are well suited for implementation in PaaS/FaaS architectures, alternative embodiments can be implemented in any suitable computing environment that would benefit from one or more of the function execution environment selection functionalities.

These and other features and advantages of the invention will become more readily apparent from the accompanying drawings and the following detailed description.

BRIEF DESCRIPTION OF THE DRAWINGS

FIG. 5A depicts an example of code to execute part of an application as a function with which one or more illustrative embodiments can be implemented.

FIG. 5B depicts an example of code to execute part of an application as a function with dynamic application decomposition with which one or more illustrative embodiments can be implemented.

FIGS. 6A through 6E depict examples of code associated with dynamic application decomposition with which one or more illustrative embodiments can be implemented.

FIGS. 7A and 7B depict examples of code associated with function execution environment selection for a decomposed application, according to illustrative embodiments.

DETAILED DESCRIPTION

Figure 1:
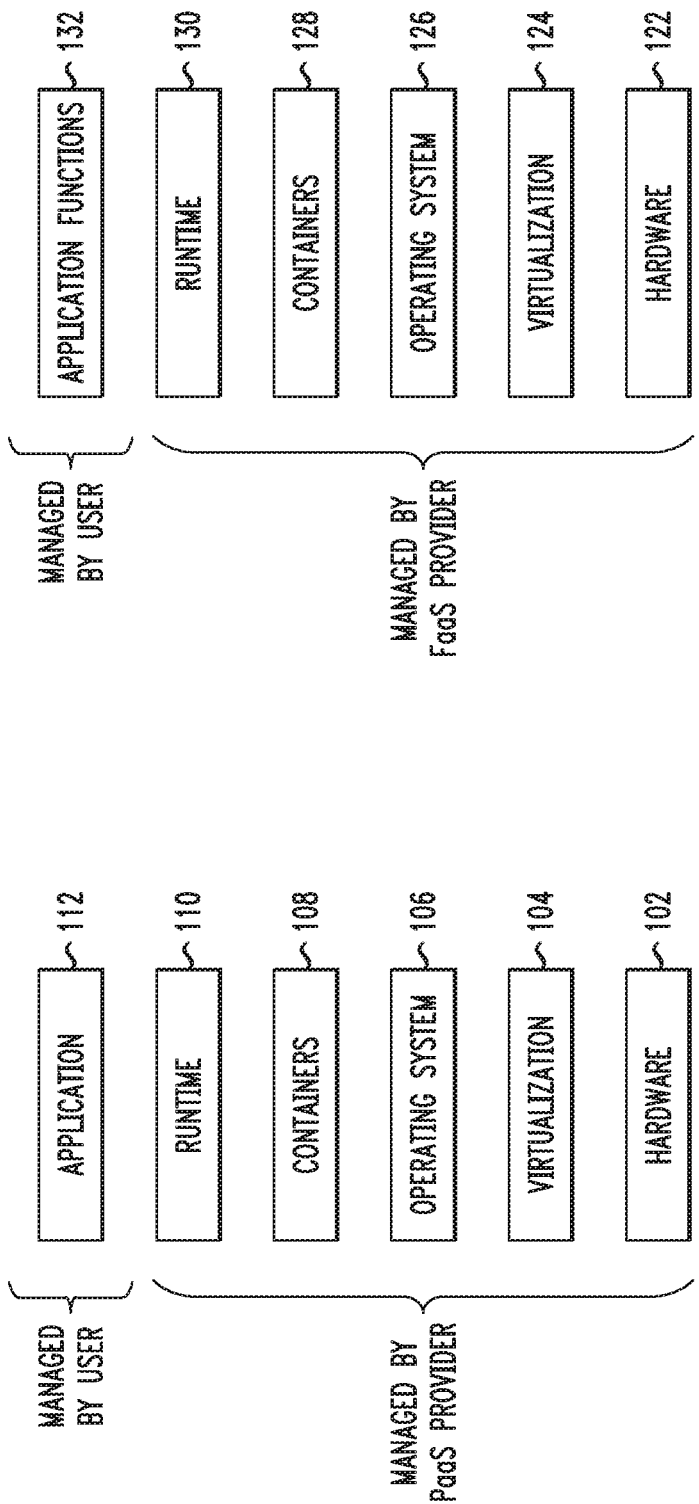
FIG. 1A depicts an example of a PaaS computing environment with which one or more illustrative embodiments can be implemented.
FIG. 1B depicts an example of a FaaS computing environment with which one or more illustrative embodiments can be implemented.

Illustrative embodiments may be described herein with reference to exemplary computing environments such as, but not limited to, cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "computing environment," "cloud environment," "cloud computing platform," "cloud infrastructure," "data repository," "data center," "data processing system," "computing system," "data storage system," "information processing system," and the like as used herein are intended to be broadly construed, so as to encompass, for example, any arrangement of one or more processing devices.

With container-orchestration serverless architectures becoming more popular, owners of monolithic style applications or microservices are seeking transformation into the serverless or container world. "Serverless" refers to a cloud computing model where the customer does not pay for underutilized resources, rather functions are taken as input and resources are typically only used to run them at execution time. In general, this type of transition involves manual refactoring of existing monolithic applications or microservices; a software engineering process which requires large amounts of human resources and time.

A solution has been proposed to enable a developer to simply mark the application components that they want to execute on a separated container on PaaS or FaaS without fully refactoring monolithic applications or microservices. However, with that solution, there is no provision for specifying the execution environment in which the separated container should run. That is, each separated container will be scheduled to an environment or node per the discretion of the PaaS or FaaS system being used. Because of that, it is realized herein that functions which benefit from specific resources or environment settings (e.g. compute, memory, or storage heavy functions) may not receive them.

For example, if a system existed with two nodes: one general-purpose node and one compute-optimized node, and an application had one container spawn which should be run in a compute-optimized environment, in the above-mentioned solution, there would be no way to specify that that function should be run in that specific environment. A "container spawn" refers to, for example, a containerized piece of code which runs separate from the main container or application. Having no way to specify these needs may lead to decomposed applications running in a less than optimal way. Functions may run slower than they could, given the existing environments which are available, and hardware would be utilized in a much less efficient way. This leads to slower applications and potentially higher running costs.

More particularly, most applications are made up of a variety of software components such as functions that perform different tasks, and as such require different resources. For example, some components might benefit from a compute-optimized execution environment while others may benefit from a memory-optimized execution environment.

When an application is decomposed into components, components run in separate containers will by default be run wherever they are scheduled, based on the default scheduling algorithm of the PaaS or FaaS, with no input from the developer. If a developer wants certain components to run on specific nodes that have the resources to serve the component(s) the best, they will need to manage that themselves.

Thus, developers currently have no efficient way to select environments where their components should run. Because of this, components executed on a PaaS or FaaS platform are often either run in execution environments providing less than optimal resources, or in execution environments with resources that are not actually needed. Currently, mitigating this problem would require both developers and operators to manually configure the execution environments where each component needs to run.

Components running in environments with less than optimal resources may run slower than if they were in a better suited environment. For example, a compute-heavy software component could run much faster in a compute-optimized execution environment than it would in a general-purpose execution environment.

With typical PaaS/FaaS (as well as CaaS or Containers-as-a-Service), services are allocated to developers on a paid subscription model where specialized services are more expensive than general-purpose ones. Developers will allocate monetary budgets for the different services they need.

Still further, in most multi-tenant CaaS environments, runtime nodes are shared across all tenants, leading to possible runtime security issues. Reserving dedicated, isolated nodes costs more, and therefore uses more of the budget. Developers should try to orchestrate only software components (e.g., functions) that require high security into these isolated nodes. However, developers do not currently have an easy way to refactor their applications. They often put the entire application into these isolated nodes, resulting in unnecessary cost.

By way of another problem, in order to obtain a same class comparison between different runtime environments, developers currently need to spend time and effort to manually configure multiple execution environments. Furthermore, it is currently not possible to AB performance test a specific component of an application without manually refactoring out the specific component.

In addition, due to budget constraints, developers may need to execute a percentage of requests for a specific software component in a specialized environment, e.g., 30% on a specialized environment, and the rest on a general-purpose environment. Developers currently need to spend a lot of time and effort to configure this type of execution environment.

Illustrative embodiments overcome the above and other drawbacks by enabling developers to add environment selection information into code markers that they are using to specify function spawns. Where the developer would put the code marker to mark a function which should be run in a separate container, according to illustrative embodiments, they can add an environment selection code marker to specify an execution environment where the function should be run. Thus, a "function marker" refers to, for example, a piece of code inserted in or near a function and meant to mark the function as being able to be broken out and run in its own container, and also to trigger selection of the type of execution environment the function should be run in.

As will be further explained in detail below, when a function which has been marked with a function marker and an environment selector(s) is invoked, the invocation is intercepted and a controller is called to decide whether to run the function in the local container or in a new separate container. However, in accordance with illustrative embodiments, the controller is also configured to evaluate the viability of running the function in one of a number of different pre-configured execution environments that the developer sets up ahead of time. The controller determines which existing and provisioned services provide specialized runtime environments which meet the needs defined by the execution environment selectors, and if one or more are found, it determines if the function can be run there based on factors such as, but not limited to, whether there is remaining budget on the service. Further, the controller prioritizes running the marked functions in the environments defined by the environment selectors, and if the controller decides the function can and should be run there, then it responds to the interceptor as such. If the controller decides that the function cannot be run in the desired environment (due to, for example, insufficient budget remaining on the service) then it will do the same check described above for one or more general-purpose environments. If the function cannot be run on any existing service, then the controller decides that the function should be run in the local container.

Prior to describing illustrative embodiments, some relevant features associated with PaaS and FaaS computing environments will be described.

FIG. 1A depicts an example of a PaaS computing environment 100 with which one or more illustrative embodiments can be implemented. As shown, a PaaS computing environment comprises the following layers/capabilities: hardware 102, virtualization 104, operating system 106, containers 108, runtime environment 110, and application 112. These layers/capabilities are well known to those of ordinary skill in the art and thus are not further described. As is also known, hardware 102, virtualization 104, operating system 106, containers 108 and runtime environment 110 are typically managed by the PaaS provider, while the application 112 itself is developed and managed by the user.

FIG. 1B depicts an example of a FaaS computing environment 120 with which one or more illustrative embodiments can be implemented. As shown, a FaaS computing environment comprises the following layers/capabilities: hardware 122, virtualization 124, operating system 126, containers 128, runtime environment 130, and application functions 132. Again, these layers/capabilities are well known to those of ordinary skill in the art and thus are not further described. As is also known, hardware 122, virtualization 124, operating system 126, containers 128 and runtime environment 130 are typically managed by the FaaS provider, while the application functions 132 are developed and managed by the user.

Thus, for example in PaaS computing environment 100, a developer (user) deploys its application 112 and the PaaS infrastructure (102 through 110) takes care of deploying the application for execution on one or more servers. In contrast, for example in FaaS computing environment 120, a developer (user) can deploy a single function or multiple functions 132 that are part of an application and the FaaS infrastructure (122 through 130) takes care of deploying the one or more application functions for execution on one or more servers.

As mentioned above, decomposing an application involves refactoring on both application code and the test suite, as well as creating separate container images and deployment manifests if the function's service does not support raw code compilation. After the application is refactored into jobs or functions, it is still quite difficult to maintain, as there could be tens of jobs and hundreds of functions for a typical application, making long-term maintenance difficult and cost heavy. Furthermore, once an application is decomposed into functions, the decision of which execution environment a given function is assigned for execution is at the discretion of the PaaS or FaaS system being used.

Accordingly, illustrative implementations for overcoming manual application decomposition problems are described below in the context of FIGS. 2 through 6E, followed by a description in the context of FIGS. 7A through 9B for providing function execution environment selection for a decomposed application according to illustrative embodiments. It is to be appreciated that function execution environment selection techniques according to embodiments covered herein are not limited to the illustrative dynamic decomposition implementations described herein but rather can be applied in any suitable application decomposition implementation that would benefit from automated function execution environment selection.

Figure 2:
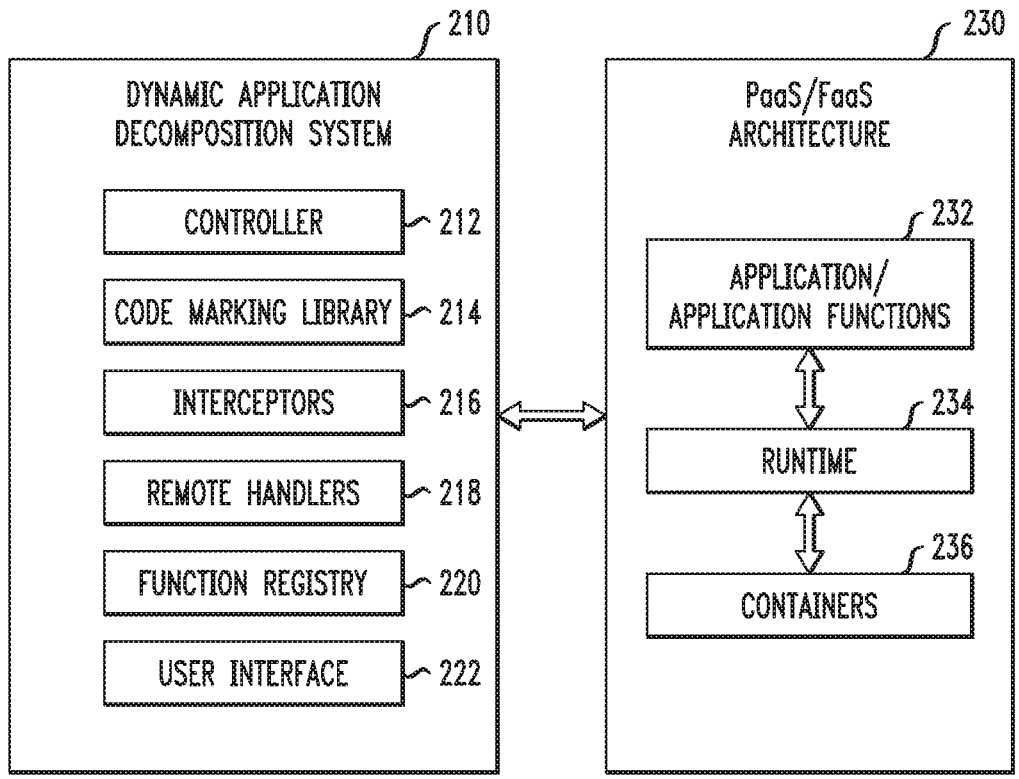
FIG. 2 depicts a computing environment with dynamic application decomposition with which one or more illustrative embodiments can be implemented.

Turning now to FIG. 2, a PaaS/FaaS computing environment with dynamic application decomposition is depicted. More particularly, computing environment 200 comprises dynamic application decomposition system 210 operatively coupled to PaaS/FaaS architecture 230. As shown, dynamic application decomposition system 210 comprises the following modules: a controller 212, a code marking library 214, one or more interceptors 216, one or more remote handlers 218, a function registry 220 and a user interface 222, which will each be described in further detail below. Note that PaaS/FaaS architecture 230 represents a portion of a PaaS computing environment (e.g., part of PaaS computing environment 100 in FIG. 1A), a portion of a FaaS computing environment (e.g., part of FaaS computing environment 120 in FIG. 1B), or some combination thereof. The architecture 230 is illustrated as a hybrid architecture simply to demonstrate that dynamic application decomposition system 210 can be implemented in any suitable type of computing environment. In particular, as shown, PaaS/FaaS architecture 230 comprises an application (PaaS architecture) and/or application functions (FaaS architecture) 232, runtime environment 234, and containers 236. Interceptors 216, remote handlers 218 and function registry 220, as will be further explained, are implemented in conjunction with containers 236. The user will not directly write them into their own code but rather they will be generated via the function markers/running the system. In some implementations, interceptors 216, remote handlers 218 and function registry 220 can be run as pieces of code alongside the application.

This implementation empowers developers to mark their code in order to specify where a piece of functionality can be broken out from the rest of the code and run in a separate stand-alone container. Dynamic application decomposition system 210 achieves these and other features via controller 212, code marking library 214, interceptors 216, remote handlers 218 and function registry 220.

The code marking library 214 provides developers the ability to annotate their code to mark which functions they want to allow to be run in their own separate containers (e.g., part of containers 236). The functionality behind these markers acts as an interceptor (one or more interceptors 216), i.e., when the functions are called, an interceptor is called instead, allowing redirection of the function invocation to an appropriate remote handler (one or more remote handlers 218) if necessary.

In one or more illustrative implementations, interceptors 216 are implemented based on the language that the application is written in. For example, AspectJ could be used for Java or function wrapping could be used for Nodejs.

Along with interceptors 216, remote handlers 218 reside within the main/local containers 236. When a function within a container is invoked, a remote handler utilizes a function registry 220 (a map of function labels to function definitions) to determine what code it needs to run, and with what arguments. The remote handler then runs the invoked function.

Controller 212 determines whether the invoked function should be run in an existing container or new container at runtime, based on developer-defined policies, telemetry, and whether the separate container already exists. In some implementations, controller 212 may not be used. In those cases, marked functions can be run in separate containers (or always on the local container, if they want to bypass the dynamic application decomposition system 210).

Together, these components in dynamic application decomposition system 210 add additional value over the current standard of developers manually refactoring the code, since developers will no longer need to physically break up their code to decompose it into functions. Rather, the added annotations allow the application to be logically broken up at runtime. This means the application can remain mostly as it was written (in a monolithic way), but run as a function-based architecture.

At runtime, new functions are spawned up in new containers and calls are redirected automatically, per the decisions of controller 212. The newly spawned functions are also horizontally scalable based on an auto-scaler setting provided by the PaaS/FaaS architecture 230.

More particularly, dynamic application decomposition system 210 further operates as follows. A given remote handler 218 scans the list of marked functions (marked as per code marking library 214) and listens for requests that invoke a particular marked function. Controller 212 determines where to run functions. Depending on the programming language, the developer marks the function that should have the ability to be split off into its own container using an annotation or function wrapper. These pieces of code become new jobs or functions.

Dynamic application decomposition system 210 provides the automation to generate deployment manifests for these jobs or functions based on the existing deployment manifest. The generated deployment manifests contain security specifications that restrict access to the newly generated jobs or functions. The developer can then deploy these new manifests to the PaaS or FaaS computing environment.

At runtime, invocation into marked functions is intercepted by a given interceptor 216 which has been created automatically for each marked function. If controller 212 decides to run the function in a separate container, then a new remote request is made to execute the call in a separate container. The medium for the request could be, for example, Transmission Control Protocol (TCP), HyperText Transfer Protocol (HTTP), Remote Procedure Call (RPC), Simple Object Access Protocol (SOAP), Publish/Subscribe (PUB/SUB), etc. If controller 212 decides not to carry out the call separately, then the interceptor 216 carries out the call locally (inside the existing container). Otherwise, the following steps are followed. The interceptor 216 serializes all arguments of the function and adds them into the body of the remote request. At new container start up time, a remote handler 218 is invoked. Remote handler 218 obtains locations of the marked functions and stores them in function registry 220. When receiving a remote request, remote handler 218 deserializes the arguments, and invokes the appropriate function. The result or error of the invocation is returned to the caller (interceptor 216) as a response. The function interceptor 216 receives the response, deserializes the result or error, and returns the result or error back to the original caller.

User interface 222 provides a visual, text-based, audio, or other user interface through which the developer (or manager, etc.) could interact. For example, the user may wish to easily select functions they would like to define policies for and analyze, and automatically run through a variety of combinations/scenarios to find the one that best optimizes the balance they are seeking between performance and cost (which could be part of the developer-defined policy). Once the best option is identified, the developer selects that option via the user interface (or the best option could be selected based on pre-defined instructions) and the code is automatically updated. In another example, the developer sees a flame graph of which application functions are optimized for performance, and which for cost (or other things), along with where the function is being run. In another example, the developer sees a dashboard with their allocated budget and current usage, and/or metrics regarding their current performance levels across the application. Similarly, the developer sees a visualization of how well optimized a function (or application) is for cost, performance, etc. These items update in real-time as the developer makes changes to the code. Alternatively, the code is updated as the developer interacts with the user interface.

Figure 3:
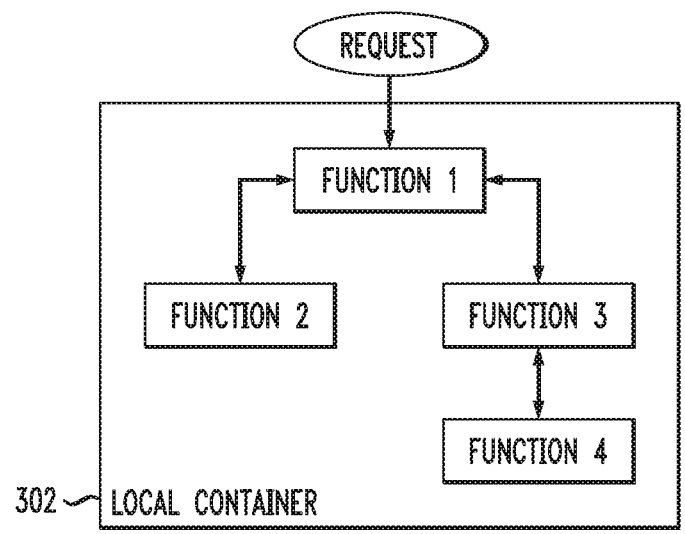
FIG. 3 depicts an example of a call flow for a request to an application with which one or more illustrative embodiments can be implemented.

FIG. 3 shows a call flow 300 for how a request to an application is handled without the use of dynamic application decomposition system 210. The request comes into the local container 302, and the function which was requested is invoked. Any functions which were referenced are also invoked. In call flow 300, this means Function 1 is run which calls Function 2 and Function 3, while Function 3 calls Function 4. Then, the response is sent back to the original requester.

Figure 4:
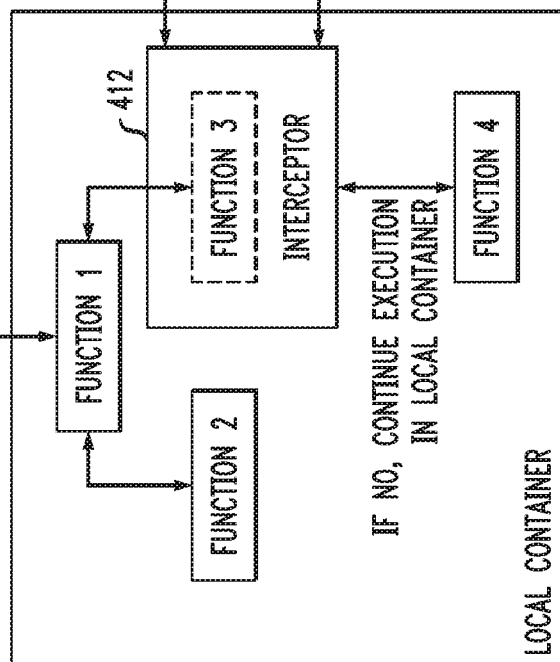
FIG. 4 depicts an example of a call flow for a request to an application with dynamic application decomposition with which one or more illustrative embodiments can be implemented.

FIG. 4 shows a call flow 400 for how a request to an application is handled with the use of dynamic application decomposition system 210. Note that interceptor 412 in FIG. 4 corresponds to one of interceptors 216 in FIG. 2, while controller 414 corresponds to controller 212, remote handler 416 corresponds to one of remote handlers 218, and function registry 418 corresponds to function registry 220.

Assume local container 402 has similar functions as local container 302 in FIG. 3. Function 1 is requested and invoked. Function 1 depends on Function 2 and Function 3, so they are invoked too. However, since Function 3 was previously marked by the developer, the invocation is intercepted by interceptor 412. Interceptor 412 asks controller 414 if the function should be run locally or in a separate container. If controller 414 responds that the function should be run locally, it is run in the local container 402. If controller 414 responds that the function should be run in a separate container, interceptor 412 forwards the request to remote handler 416 in separate container 404. Remote handler 416 finds the function to be invoked via function registry 418, and the function is then invoked, e.g., in this example, Function 3. Note that Function 4 depends from Function 3. The response is then sent back down through each of the previous components until it is received by the original caller.

Note that in separate container 404, Function 1 and Function 2 exist but will never be run there. In call flow 400, Function 1 and Function 2 will only ever be run within the local container 402. However, if they had been marked by the developer, then the call stack would get more complicated as they would have the ability to be run in separate containers as well.

Also note that while call flow 400 includes Function 1 and Function 2 in the separate container 404, they do not necessarily have to exist there. Depending on the implementation, their code could stay in the separate container but remain dormant, or they could be pruned out entirely.

Given the above described illustrative implementations of dynamic application decomposition system 210, the challenges mentioned above (i.e., (i) effort required to decompose an application; (ii) microservice or function optimization; (iii) on-going maintenance; (iv) dynamic call-flow configuration; (v) dynamic call-flow configuration with telemetry; and (vi) cold start wait time) are addressed as follows:

(i) Effort required to decompose an application. Instead of creating separate container images and refactoring code into separate repositories, developers can simply insert annotations or function wrappers into their code, turning a laborious manual process into a quick and simple one.

(ii) Microservice or function optimization. Oftentimes, development teams do not know exactly how to optimize their application to maximize the balance between performance and cost. By the proposed dynamic application decomposition framework, teams can break down different scenarios to determine which optimizes their application the best, by testing out different scenarios in a production environment. From there, the developer could save various scenarios that they had run, and/or run several simultaneously. This would enable the developer to determine the most optimal scenario for their needs. In addition, with a developer-defined policy, the developer can decide to route a certain percentage of invocations to be executed in the new function's container and the rest to be executed in the local container. This could be done, for example, by the developer specifying in the policy the percentage of the invocations that would be routed to a separate container. This feature is useful for A/B testing to compare performance data for executing in the local container versus in the separate container.

(iii) On-going maintenance. Instead of breaking the application into many pieces and managing multiple Docker images, the application can remain in one piece. The same Docker (container) image can be used so that developers do not need to manage large numbers of Docker images. Developers can manage one code base, one application and one Docker image. They also would not need to change their test suite. The functions they have marked in their code base remain where they are and, as such, can be tested with the existing test suite. The developers can also maintain just a single deployment manifest that has essential information about the current application. This manifest is used to generate the deployment manifests for new jobs and/or functions. Developers can optionally provide a blueprint prior to the generation and/or modify the generated manifests afterwards.

(iv) Dynamic call-flow configuration. With the markers in the code and the controller installed in the PaaS or FaaS computing environment, by using the controller, the developer can directly create and manage policies that would alter runtime behavior without any further code changes. For example, the developer can change the policy of a spawn from "always" to "never" and stop that function from executing in a separate container.

(v) Dynamic call-flow configuration with telemetry. With the markers in the code and the controller installed in the PaaS or FaaS computing environment, the controller can determine dynamically whether to send remote requests to a separate container. For example, when the policy of a spawn is set to "auto", not "always" nor "never", the decision will be made based on expected or known execution time, traffic volume, resource consumption, available resource in cluster and other factors. For example, if too many resources are being used or are expected to be used, or if there is a high volume of traffic, then the controller could decide to break the function out into its own separate container. In the case when the controller decides not to execute remotely, the function invocation will occur in the local container. On the other side, if the controller decides to execute remotely on a FaaS, the controller also takes into consideration a historical start up time of a new container and whether the container is already up-and-running, to determine whether to wait for a new container to be spawned up.

(vi) Container cold-start wait-time. When a function has been invoked by an incoming request, and the following conditions are satisfied:
 1. The function is deployed on a FaaS.
 2. The marker for this function is added in the code and controller is installed.
 3. The policy of the function is set to leave invocation decision to the controller.
 4. A separate container for the invoked function does not yet exist, and the controller decides to avoid waiting for the container to start up and execute the function locally.
 5. Based on a predictive model, the controller decides that a new container for this function is necessary.

Then, the controller sends a predefined request to initiate a new container for this function. Future requests to invoke the same function can then be routed to the new container without cold-start wait-time, while the current invocation is executed in the local container to avoid wait-time.

Accordingly, dynamic application decomposition system 210 provides many unique advantages over existing application processing approaches. Some of these advantages include the following:

(i) Container spawn with code marker. Instead of manually refactoring existing applications, developers can use code markers, function wrappers or annotations to specify code which should have the ability to run in a separate container. At runtime, containers are generated accordingly, and traffic is redirected to the new containers.

(ii) Dynamic container spawn with developer-defined policies. Instead of hardcoding the decision on whether function spawns will occur, developers can change behavior at runtime without code change. For example, this could be done by communicating to the controller directly to specify "always", "auto" or "never" for each function spawn marked in code.

(iii) Dynamic container spawn with telemetry. When the policy is set such that the decision of where to run the function is left to the controller, the controller decides whether spawning a new container and redirecting traffic is necessary by looking at factors such as execution time, traffic volume, resource consumption, available resources in cluster, etc.

(iv) Avoiding cold-start wait-time. When certain conditions are met (see conditions 1 through 5 above), the controller triggers the initialization of a new container for the invoked function so that future requests can consume the new container without wait-time. In the meantime, the original request, as well as any incoming requests that are received before the new container is created, are processed in the local container.

(v) Partial traffic routing. With a developer-defined policy, the developer can decide to route a certain percentage of invocations to be executed in the new function's container and the rest to be executed in the local container. This could be done, for example, by the developer specifying in the policy the percentage of the invocations that would be routed to a separate container. This feature is useful for AB testing to compare performance data for executing in the local container versus in the separate container.

Given the above described illustrative implementations of dynamic application decomposition system 210, some examples/use cases will now be described.

Example 1—Running Nodejs Code as Functions on KNative

For a Nodejs application running on Kubernetes, if a developer would like to run a part of the application as a function on KNative (note that Knative is a FaaS platform built on top of Kubernetes, which is a CaaS platform), the developer can do the following. In the module containing the function which the developer wishes to mark, find the function declaration statement and update it from the code 502 shown in FIG. 5A to the code 504 shown in FIG. 5B.

This example shows how one would mark function1 in code 504 to be able to be run separately in its own container. In this example, function2 is left untouched. In this example, "marked function" represents the function wrapper that would return a modified function with an interceptor. This means that when function1 is called, instead of the provided function being called directly, the interceptor will be called which will handle the extra logic. This "marked_function" function invocation is evaluated at application start up time as a top-level function invocation.

To generate a deployment manifest for the newly generated function, the system 210 executes logic that scans for occurrences of "marked_function" in the source code and generates new deployment manifests based on an existing service manifest. For example, command line code 602 in FIG. 6A can be used to generate the manifest.

Where <original knative service file> is the existing service manifest for knative, <root directory> is the root directory of the developer's application source code and <output file> is the location where the new manifest should go. For example, an invocation can be defined as per code 604 in FIG. 6B. Then, the new deployment manifest would be applied to Kubernetes along with the original one as shown in code 606 in FIG. 6C.

At runtime, if the controller decides the invoked function should be run separately, then a new container will be created to run the function. At the start-up time of the new container, "marked_function" registers each marked function into a function registry and invokes the functions accordingly when a request is received.

Example 2—Running Java Code as Container on Kubernetes

For a Java application running on Kubernetes, if a developer would like to run a part of the application in another container on Kubernetes as a long-running job, the developer can add "Marked_function" annotation to the function that should run separately in another container when necessary. For example, if a "sayHello" function already exists, a developer would add the "Marked_function" annotation as shown in code 608 in FIG. 6D.

This method of annotation is different from the function wrapping shown in Example 1. Using AspectJ (an aspect-oriented programming extension for the Java programming language) the same goal of allowing to add an interceptor to the marked function is achieved. The deployment manifest can be generated using command line code 610 in FIG. 6E.

This step is mostly the same as the one shown in Example 1. The first three arguments are the same as in Example 1, however, there is an additional argument at the end to determine the base package of the class that the function belongs to. In this case that is "com.example.helloworld".

In this case, once the new deployment manifest is deployed onto Kubernetes, new containers will be created. When new containers are spawning up, a remote handler is initialized and a scan for methods with "Marked_function" annotation is executed. These functions are added to a function registry as in Example 1.

During runtime, if the controller decides to route a function invocation to a separate container, a remote call is made with the arguments serialized. When the new container receives the remote call, the arguments are deserialized and the appropriate method is called from the function registry. Once the method finishes executing, the result is serialized and sent back to the original container.

Example 3—Customer Focused Interface to Support Composable Strategy

Assume a scenario where optimizations at the hardware level are needed to create better resource utilization and achieve higher power efficiency. In a purely composable (disaggregated) solution, current management paradigms require multiple layers of operations support which is the anti-thesis of the eventual "NoOps" concept many organizations are seeking. NoOps is the concept that an IT environment becomes so automated and abstracted from the underlying infrastructure that there is no need for a dedicated team to manage software. Utilizing dynamic application decomposition as described herein, the abstraction of resource utilization enables the dynamic routing required to specific disaggregated components.

During runtime, since the potential compatible functions may be marked with implemented capabilities/satisfied interfaces, the controller can decide to route a function invocation to a separate abstraction that may be tied to a specific hardware accelerator. The controller participating in the compilation process can facilitate the necessary hardware composition and configuration to support the function type. Considering cost calculations for network latency, some expensive operations for acceleration (e.g., tensor processing unit or TPU) may be highly optimized for a monolithic application specifically without the need to refactor the entire application.

Recall, as mentioned above, once an application is decomposed into functions, the decision of which execution environment a given function is assigned for execution is at the discretion of the PaaS/FaaS/CaaS system being used. Turning now to FIGS. 7A through 9B, illustrative embodiments are described that provide function execution environment selection for a decomposed application that overcome these and other issues.

It is to be understood that, in one or more illustrative embodiments, function execution environment selection is performed in accordance with a controller and a code marking library such as, but not limited to, controller 212 in FIG. 2 and code marking library 214 in FIG. 2, as well as other elements described in the context of FIG. 2 (as well as corresponding elements described in the context of FIG. 4).

The code marking library serves two main purposes. The first main purpose is for marking functions which a developer wishes to give the ability to be run in a separate container from the rest of the application (as described above in the context of FIG. 2). This is a mechanism for decomposing a monolithic application into components (functions). The second main purpose is function execution environment selection. Function execution environment selection adds the ability for developers to add environment selectors to these code markers in order to mark functions with information about hardware requirements of the functions.

In order for function execution environment selection to operate, environments first need to exist. In illustrative embodiments, one or more execution environments are prepared by one or more CaaS platforms. For example, if worker nodes exist that have greater than average memory capabilities, they are labeled "memory-optimized". This label is then used by a FaaS platform such as Knative to access the node with high memory capabilities by providing the label "memory-optimized" to Kubernetes.

In addition to the labels above describing the hardware requirements, the labels can also describe other environment requirements. For example, in some embodiments, "isolated" is added as a label for a function, so that this function only runs on a node that is dedicated for this user. There are no containers running functions of any other applications in that node. Such environment isolation provides security benefits by preventing a function trying to access another container that is running in the same node.

Once these environments are set up, the labels associated with them are added by the developer to the function marker to denote which execution environment(s) the function should run on if possible.

The code marking library is configured to access the markers and generate interceptors (216 in FIG. 2) for marked functions, as explained above. An interceptor intercepts any invocations of the component it is bound to and is able to execute that component locally in the same container or execute it remotely in a separate container based on the decision made by the controller. In addition to this, the environment selector is used to decide what kind of specialized environment the software component should run in (e.g. compute-optimized, memory-optimized, accelerator-optimized, isolated, etc.). These types of execution environments are pre-defined, and already exist (e.g., configured). This will be explained further below.

FIG. 7A depicts an example of code 702 for a single environment selector, according to an illustrative embodiment. More particularly, as shown in code 702, a piece of code written in Golang uses a go generate mechanism to read a marker (e.g., implemented as a comment) of a function. For example, in code 702, "memory-optimized" indicates that this software component will be better suited running on memory-optimized hardware.

Note that while FIG. 7A shows a function marker containing a single environment selector, function markers can specify more than one environment selector, specified in some order (for example, in order of preference). For example, FIG. 7B depicts an example of code 704 for multiple environment selectors, according to an illustrative embodiment.

Illustrative embodiments take advantage of the fact that many different types of hardware setups exist, and they have varying costs to the user; some are very expensive while some are quite inexpensive. Because of this, users of these services could set a quota, or budget so they do not overuse expensive resources.

Thus, a main purpose of the above-referenced controller (212) is to make the decision on where to run the software component based on various factors. As described above, the controller decides whether to run the software component in the local container or in a separate container based on expected or known execution time, traffic volume, resource consumption, available resource in cluster, whether the separate container is ready and other factors. But, as described so far in the context of FIGS. 1A through 6E, the only decision made by the controller after considering those factors is whether to run the software component locally or in a separate container. Embodiments illustratively described in the context of FIGS. 7A through 9E introduce additional factors, for example, the environment selector defined in the marker, the total quota set by the user, and the remaining budget for the optimized hardware the marked software component requested. Factors other than quota and remaining budget can be used additionally or alternatively to select an appropriate execution environment for a function to run.

With these factors, the controller now also decides in which specific remote execution environment to run the software component if the decision has been made to run it remotely. For example, the controller finds the current optimum hardware option for the software component based on one or more additional factors mentioned above. The controller attempts to use the most optimal environment for the software component first (the one requested via the environment selector). If the requested environment cannot be selected due to, for example, insufficient budget or the environment not existing, the controller successively chooses the next most optimal environment (e.g., the other environments requested by the developer via environment selectors, or default environments which could be set) until no specialized or general-purpose environments meet the needed requirements to run the software component (e.g., sufficient budget remaining). If no execution environment meets these requirements, the controller's default decision is that the software component be run locally.

Figure 8:
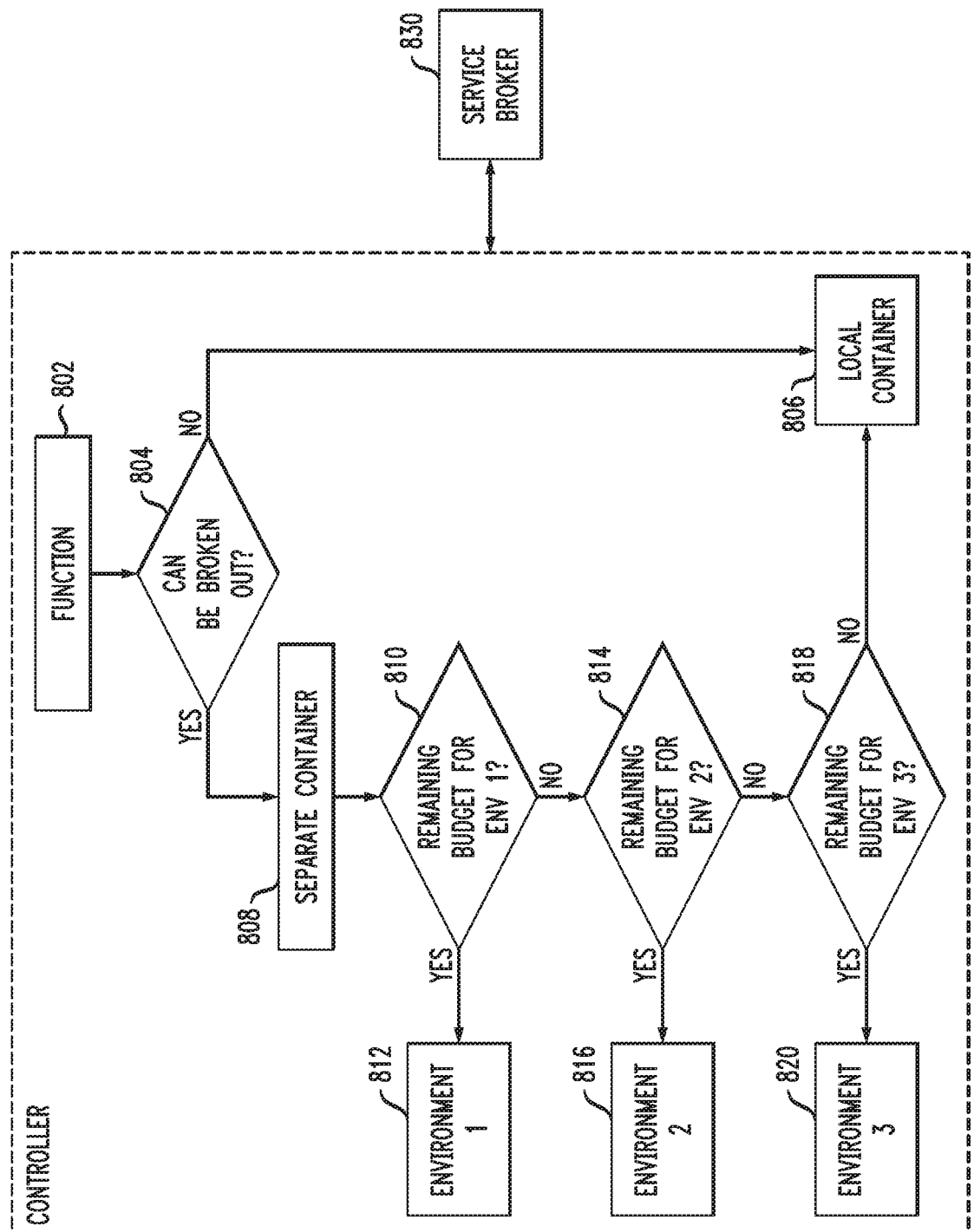
FIG. 8 depicts function execution environment selection for a decomposed application in a computing environment, according to an illustrative embodiment.

FIG. 8 depicts function execution environment selection 800 for a decomposed application in a computing environment, according to an illustrative embodiment. More particularly, FIG. 8 shows the structure of a decision tree used by the controller (212) for a generic situation where three environment selectors were found in (e.g., previously inserted by the code developer) the function marker. Thus, for a given function 802, a "can (the given function) be broken out" decision 804 is made based on expected or known execution time, traffic volume, resource consumption, available resource in cluster, whether the separate container is ready and other factors, as described above. If decision 804 is "no," then the controller decides that the given function 802 be executed in the local container 806, as explained above; and if decision 804 is "yes," then the controller decides that the given function 802 be executed in a separate container 808, as explained above in the context of FIG. 4.

However, when the decision is made to execute the given function 802 in a separate container, the controller using the decision tree of FIG. 8 then goes on to attempt to select a function execution environment from the environments specified in the function marker associated with the given function 802, based on steps 810 through 820. Examples of execution environments include, but are not limited to, a compute-optimized execution environment, a memory-optimized execution environment, general-purpose execution environment (e.g., FIG. 7B). Additional or alternative types of execution environments can be specified in the function marker. More particularly, each "remaining budget for Env (execution environment)" decision (810, 814, 818) is based on the remaining budget for a service and a quota set by the developer. Thus, as shown, if step 810 determines that there is remaining budget for Environment 1 (812), then the controller instructs that the given function 802 be executed in Environment 1. If not, the controller then goes on to similarly evaluate Environment 2 (814/816) and, if Environment 2 is not possible, then Environment 3 (818/820) is evaluated. If none of the specified function execution environments are appropriate, then the decision is made by the controller to have the given function 802 remain at local container 806 for execution.

Note that if only a single execution environment is specified in the function marker associated with given function 802 (e.g., FIG. 7A), then the decision tree of the controller only considers that execution environment for execution before opting for the local container.

Once a decision has been made about where to run an invoked software component, the controller is also responsible for deploying the marked functions as a separate container on a PaaS or FaaS platform. If the running environment of the marked functions is changed by the controller (e.g., if the marked function was already deployed to the compute-optimized environment but then that environment's budget ran out and the marked function was invoked again), the controller redeploys this software component in a different environment dynamically following the same decision making process explained above in the context of FIG. 8.

Accordingly, in illustrative embodiments, because the controller is responsible for deploying the software components, it is thus made aware of the existence of the different environments and obtains labels to differentiate them. The controller also obtains credentials for interacting with the PaaS or FaaS platform.

There are various ways for the controller to obtain the credentials to the PaaS or FaaS platform, and the method is based on the application programming interface (API) and the implementation of the PaaS or FaaS platform. For example, in one illustrative embodiment, credentials are given directly to the controller at start time through the command line. Another illustrative embodiment provides for a service broker between the controller and the CaaS/PaaS/FaaS being used. With a service broker, the developer signs up for the service and binds the service instances to the application or microservice. By way of example, a service broker is shown in FIG. 8 as 830, and will be further described below.

Information about the existing execution environments can be given to the controller directly at start time or can be obtained dynamically at runtime from the FaaS platform. The latter is possible because the controller already has the credentials mentioned above. For example, if there exist two environments: one which is compute-optimized and one which is memory-optimized, the controller is made aware of their existence, and that the compute-optimized environment is referenced as "compute-optimized" and the memory-optimized environment is referenced as "memory-optimized."

Given the above-described function execution environment selection techniques, many advantageous features are realized, by way of example only:

(i) Environment selection for components using function markers. Software component can be broken out from an application to be run on a FaaS platform using function markers. Further, the method allows for specification of where software components should run using function markers.

(ii) Hardware usage optimization with application decomposition. With the ability to specify hardware requirements for software components, developers can declare the resources that the functions consume. This way, the resources which the function does not consume are not wasted and are freed for other functions/processes to consume. These resources would be un-utilized otherwise.

(iii) Performance improvements at function level by application decomposition with function markers. With the ability to specify hardware requirements for software components, developers can declare the resources that individual software components consume. Because software components will now have the ability to run in environments containing the optimal resources for their execution, the software components benefit from performance improvements.

(iv) Automated environment orchestration for decomposed applications based on service plans, budget and function markers. Functions can be scheduled to specific environments in accordance with illustrative embodiments based on existing service plans and user-defined budgets using function markers in the code. All a developer must do is ensure the environments have been setup and that the controller is aware of their existence. Then, once the function markers are in place, the controller handles the orchestration of the environments (e.g., it takes care of scheduling functions to the environments where they should run).

(v) Running components in an isolated environment using function markers. If an application involves confidential information, some broken out functions might process that piece of information inside their container. If the container is compromised by a suspicious function running in another container inside the same node, the information might be compromised as well. In accordance with illustrative embodiments, a developer can decide which functions should run in an isolated environment to prevent the above potential security issue, while keeping other non-confidential functions in shared environments.

(vi) Specialized-Hardware-as-a-Service for microservices and functions. Without illustrative embodiments, developers would need to refactor the entire application to decompose a software component out into a separate container, and then manually schedule these separate containers into special environments. With illustrative embodiments, the process is as simple as specifying the special environment in the function markers, signing up for a service in a marketplace, and binding the service instance into the original application. The rest is handled by the controller to ensure that the software components are executed in the correct environment described by the service plan and user preference.

(vii) Dynamically deciding where to execute software components for AB testing. Illustrative embodiments give users the ability to specify that a certain software component should have the ability to run on more than a single node. By specifying a tag (for example, "partial" or "XX %"), users can specify that a specific software component can run in one environment for some portion of its invocations and another environment for another portion of its invocations. This is very useful for the developers as a form of easy AB testing.

The following use cases show examples of how illustrative embodiments behave.

(1) Application Decomposition with Specialized Runtime Environment on Amazon Web Services (AWS)

Assume that there is a company which provides PaaS using AWS as their infrastructure provider. This PaaS uses Kubernetes to orchestrate containers and allocates many different types of virtual machines (VMs) to be provisioned as Kubernetes workers with corresponding labels on the workers.

Figures 9A, 9B, 10:
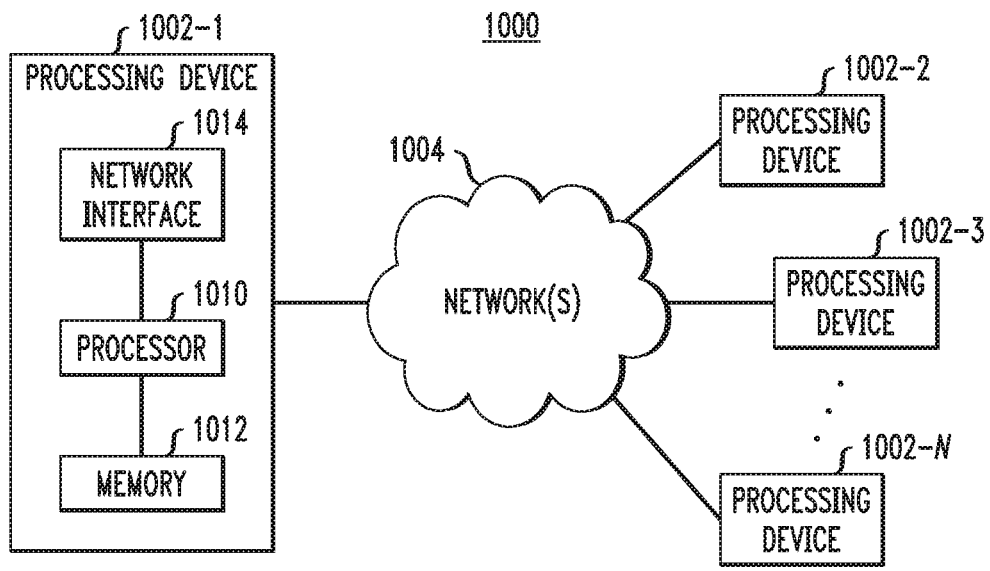
FIGS. 9A and 9B depict use case examples associated with function execution environment selection for a decomposed application, according to illustrative embodiments.
FIG. 10 depicts a processing platform used to implement a computing environment with function execution environment selection for a decomposed application, according to an illustrative embodiment.

For example, FIG. 9A depicts table 902 which shows how each selectable function execution environment can be labeling with EC2 VM types. This PaaS platform also has an interface for developers to sign up for different services providing different hardware resources. Assume that the developers from a bank developed an application that will detect abnormal transactions of credit cards. One function of this application is to continuously build a model, based on updated transaction data, to detect abnormal transactions by running machine learning (ML) algorithms. This function would require more accelerator resources. Another function's purpose is to infer whether the incoming transaction is abnormal by applying the model built from the first function. This function would be required to provide a very quick response to each transaction. A compute-optimized worker node would increase the performance of this function.

The bank decides to move to the PaaS platform described above because it provides the ability to decompose an application to run in serverless style to save budget. The developers will only need to add markers to functions based on the resources the functions benefit from most. For example, an accelerator-optimized label could be added to the first function and a compute-optimized could be added to the second function.

Developers will sign up for different services that provide certain hardware resources corresponding to the labels which have been added to the functions. Developers will then configure budgets for each of the services and deploy the application to the PaaS platform.

With function execution environment selection being enabled on this PaaS platform, the marked functions will run in their desired hardware environments if the budget allows when the functions are triggered. The application does not need to run on a large profile VM with some of the expensive resources only being used when certain functions of the application are triggered. The bank only needs to pay for the usage of special hardware used by functions when they are triggered.

(2) Application Decomposition with Specialized Runtime Environment on Enterprise Information Technology (IT) Infrastructure This example is very similar to example (1) above, however, instead of running applications on a PaaS platform that is built on top of a public cloud service provider such as AWS or Google Cloud, assume the bank will set up a PaaS/CaaS on top of its own enterprise IT infrastructure. This allows the bank to have higher levels of privacy and security of their sensitive data since the data can always stay behind their firewall. Suppose the bank's IT is using the products illustrated in FIG. 9B for their services and infrastructure, and they are labeled as per table 904.

For the same application mentioned in example (1) and with the same function labels, the functions will be run in the hardware listed in table 904 with the corresponding labels. The function requiring the additional accelerator resources will run on the PowerEdge R840 which has been labeled "accelerator-optimized," and the function requiring heavy compute resources will run on the PowerEdge R940xa which has been labeled "compute-optimized."

(3) Application Decomposition with Isolated Runtime Environment on Enterprise IT Infrastructure for Security Suppose there are two companies: Company A and Company B. Company A and Company B are competitors, and both companies are small and do not have the funds for their own enterprise IT infrastructure. Both companies need to store and use sensitive data, but both companies use the same service provider. To keep their data safe, they each have the desire to run their applications on isolated nodes to avoid potential data breaches.

However, running on an isolated node is much more costly than running on shared nodes. Because only certain functions in each of the company's applications deal with this sensitive data, the companies can save money by running only those specific functions on the isolated nodes and running the rest of the application on shared nodes. In accordance with illustrative embodiments, this can be accomplished by adding function labels into their applications with environment selectors referencing the isolated nodes. This way, the marked functions (the ones which handle the sensitive data) will only run on the isolated nodes allocated specifically for them, while the unmarked, or differently marked functions will run on shared nodes.

(4) Controller Decision Flow for Function Marker with Multiple Environment Selectors Assuming a function marker contains multiple environment selectors (e.g., FIG. 7B), and the function it corresponds to is invoked, the controller will try to decide which environment to run the invoked function in by following the process described above with respect to FIG. 8. That is, the controller would first check to see if the function should be broken out and run in its own container at all, or if it is better given the current circumstances to run the invoked function in the local container. If the controller decides to run the function in a separate container, it will find the most favorable environment based on the environment selectors (in this example, a scheme is assumed where priority of environments is indicated by the order in which they appear in the function marker, although other priority mechanisms can be employed). In the FIG. 7B example, assume the most favorable environment is the compute-optimized environment. The controller will then check to see if there is still budget remaining for the compute-optimized environment. If there is, it will run the function there. If not, it will repeat this process with the other two specified environments (memory-optimized and general-purpose). If the controller fails to schedule the function in any of those three environments due to insufficient budget, it will default to running the function in the local container.

(5) Example Budget Plans

Developers employing illustrative embodiments will have the ability to set their budgets for a particular environment using a number of different budgeting schemes to allow function execution environment selection to work with environments secured through a number of different entities.

An example of a budgeting scheme could be that the first 1,000 function execution seconds on a specific node, e.g., a node labeled "compute-optimized," are free while the rest are charged to the user at $0.0001 per CPU-second ("CPU-second" is one second of a program actively running on a CPU).

Further assume in this example, the user has set a budget of $1,000 for the compute-optimized environment. If this is the case, each time the controller wants to know if a function can be scheduled to that environment, it will use hooks (queries or interfaces) placed on the PaaS or FaaS system to check the remaining budget for the environment in question. The controller would allow for up to 10,001,000 seconds of compute time (enough to exhaust the budget completely but not go over it). After that point, any additional function invocations that the controller attempts to schedule to that environment will be sent to a different environment with remaining budget.

Another example could be that 10,000 GB-seconds ("GB-second" is one Gigabyte of memory utilized for one second) are free for a node, and additional GB-seconds are charged at a rate of $0.000001 per GB-second used. If this were the case, the same logic described above would be followed.

It could also be the case that the controller mentioned in illustrative embodiments does not directly contact the PaaS or FaaS system but instead contacts a controller in a separate auditing service created and installed on the hosts. Regardless of which controller does this check, the PaaS or FaaS platform will be contacted to check the remaining budget.

(6) Service Broker

Use of a service broker (e.g., 830 in FIG. 8) serves the purpose of obtaining credentials to the FaaS platform being used and transferring those credentials to the controller so that it can deploy functions in environments which the user has signed up for when necessary. This would prevent the user from having to manually provide the credentials to the controller.

In some embodiments, the service broker is deployed on the existing software defined CaaS/PaaS/FaaS marketplace. Services which could be connected to the service broker would include specialized runtime environments such as "compute-optimized," "memory-optimized," "storage-optimized," "general-purpose," etc. Developers would sign up for the services corresponding to the physical environments they have access to (e.g., if they have one compute-optimized node, they would sign up for the "compute-optimized" service).

Next, at application deployment time, developers would bind their application which contains the function markers defined herein to the services mentioned above. This binding would make it possible for the application to obtain the credentials or token needed to access the FaaS platform being used. The token could then be saved in the local container as an environment variable, or in any form which leaves it accessible to the interceptors/controller. The token could then be obtained by the controller (either directly, or by being passed from the interceptor) and used for deployments.

FIG. 10 depicts a processing platform 1000 used to implement function execution environment selection, according to an illustrative embodiment. More particularly, processing platform 1000 is a processing platform on which a computing environment with functionalities described herein (e.g., FIGS. 1-9B and otherwise described herein) can be implemented.

The processing platform 1000 in this embodiment comprises a plurality of processing devices, denoted 1002-1, 1002-2, 1002-3, . . . 1002-N, which communicate with one another over network(s) 1004. It is to be appreciated that the methodologies described herein may be executed in one such processing device 1002, or executed in a distributed manner across two or more such processing devices 1002. It is to be further appreciated that a server, a client device, a computing device or any other processing platform element may be viewed as an example of what is more generally referred to herein as a "processing device." As illustrated in FIG. 10, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 1002 shown in FIG. 10. The network(s) 1004 represent one or more communications networks that enable components to communicate and to transfer data therebetween, as well as to perform other functionalities described herein.

The processing device 1002-1 in the processing platform 1000 comprises a processor 1010 coupled to a memory 1012. The processor 1010 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1010. Memory 1012 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1012 may comprise electronic memory such as random-access memory (RAM), read-only memory (ROM) or other types of memory, in any combination. The one or more software programs when executed by a processing device such as the processing device 1002-1 causes the device to perform functions associated with one or more of the components/steps of system/methodologies in FIGS. 1-9. One skilled in the art would be readily able to implement such software given the teachings provided herein. Other examples of processor-readable storage media embodying embodiments of the invention may include, for example, optical or magnetic disks.

Processing device 1002-1 also includes network interface circuitry 1014, which is used to interface the device with the networks 1004 and other system components. Such circuitry may comprise conventional transceivers of a type well known in the art.

The other processing devices 1002 (1002-2, 1002-3, . . . 1002-N) of the processing platform 1000 are assumed to be configured in a manner similar to that shown for computing device 1002-1 in the figure.

The processing platform 1000 shown in FIG. 10 may comprise additional known components such as batch processing systems, parallel processing systems, physical machines, virtual machines, virtual switches, storage volumes, etc. Again, the particular processing platform shown in this figure is presented by way of example only, and the system shown as 1000 in FIG. 10 may include additional or alternative processing platforms, as well as numerous distinct processing platforms in any combination.

Also, numerous other arrangements of servers, clients, computers, storage devices or other components are possible in processing platform 1000. Such components can communicate with other elements of the processing platform 1000 over any type of network, such as a wide area network (WAN), a local area network (LAN), a satellite network, a telephone or cable network, or various portions or combinations of these and other types of networks.

Furthermore, it is to be appreciated that the processing platform 1000 of FIG. 10 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1000 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers. As illustratively used herein, a container is considered a "virtual computing element" (e.g., unit of software) that packages application code and its dependencies so that the application is executed quickly and reliably from one computing environment to another. A Docker container image is a lightweight, standalone, executable package of software that includes all components needed to execute an application.

The particular processing operations and other system functionality described in conjunction with FIGS. 1-10 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
    at least one processing platform comprising one or more processing devices;
    said at least one processing platform being configured to:
        execute a portion of an application program in a first virtual computing element, wherein the application program is decomposed into functions and comprises one or more portions of marked code, the marked code comprising a given function to run in a separate execution environment from the rest of the application program and an environment selection code marker to specify a plurality of execution environments where to execute the given function of the marked code, wherein the plurality of execution environments specified in the marked code comprise a plurality of different pre-configured execution environments for code execution;
        receive a request for execution of one of the one or more portions of marked code;
        decide whether to execute the portion of marked code identified in the request in the first virtual computing element or in a second virtual computing element;
        determine an execution environment from the plurality of execution environments specified in the environment selection code marker of the marked code for the second virtual computing element to execute the marked code, when it is decided to execute the portion of the marked code in the second virtual computing element; and
        execute the portion of marked code identified in the request;
    wherein the processing platform is further configured to determine an execution environment from the plurality of execution environments specified in the marked code by:
    evaluating at least one selection criterion for the plurality of execution environments and selecting an execution environment based on the evaluation; and
    wherein evaluating at least one selection criterion for the plurality of execution environments comprises:
    considering a remaining budget from a given quota for a first one of the execution environments; and
    selecting the first execution environment as the execution environment for the second virtual computing element to execute the marked code when sufficient remaining budget exists for the first execution environment.

2. The apparatus of claim 1, wherein the processing platform is further configured to evaluate at least one selection criterion for the plurality of execution environments by:
    considering a remaining budget from the given quota for at least a second one of the execution environments when insufficient remaining budget exists for the first execution environment; and
    selecting the second execution environment as the execution environment for the second virtual computing element to execute the marked code when sufficient remaining budget exists for the second execution environment.

3. The apparatus of claim 1, wherein the processing platform is further configured to evaluate at least one selection criterion for the plurality of execution environments by:
    defaulting to the first virtual computing element to execute the portion of the marked code when the plurality of execution environments specified in the marked code fail to satisfy the at least one selection criterion.

4. The apparatus of claim 1, wherein the plurality of execution environments specified in the marked code are evaluated based on a given order.

5. The apparatus of claim 1, wherein the plurality of execution environments further comprise one or more execution environments specifically configured to accommodate one or more execution criteria.

6. The apparatus of claim 5, wherein the one or more execution criteria comprise one or more of compute-optimized execution, memory-optimized execution, storage-optimized execution, accelerator-optimized execution, general-purpose execution, and isolated execution.

7. The apparatus of claim 1, wherein the processing platform is further configured to cause the portion of marked code identified in the request to be executed by managing orchestration of the execution of the portion of the marked code within a selected one of the plurality of execution environments.

8. The apparatus of claim 1, wherein the processing platform is further configured to access a service broker to obtain credentials for a selected one of the plurality of execution environments.

9. The apparatus of claim 1, wherein each of the one or more portions of marked code are marked by a function wrapper or an annotation.

10. The apparatus of claim 1, wherein the one or more portions of marked code comprise one or more application functions.

11. The apparatus of claim 1, wherein the first virtual computing element is a first container and the second virtual computing element is a second container remote from the first container.

12. The apparatus of claim 1, wherein the processing platform comprises a controller module, one or more interceptor modules, one or more remote handler modules, and a function registry module.

13. A method comprising:
executing a portion of an application program in a first virtual computing element, wherein the application program is decomposed into functions and comprises one or more portions of marked code, the marked code comprising a given function to run in a separate execution environment from the rest of the application program and an environment selection code marker to specify a plurality of execution environments where to execute the given function of the marked code, wherein the plurality of execution environments specified in the marked code comprise a plurality of different pre-configured execution environments for code execution;
receiving a request for execution of one of the one or more portions of marked code;
deciding whether to execute the portion of marked code identified in the request in the first virtual computing element or in a second virtual computing element;
determining an execution environment from the plurality of execution environments specified in the environment selection code marker of the marked code for the second virtual computing element to execute the marked code, when it is decided to execute the portion of the marked code in the second virtual computing element; and
executing the portion of marked code identified in the request;
wherein the step of determining an execution environment from the plurality of execution environments specified in the marked code further comprises:
evaluating at least one selection criterion for the plurality of execution environments and selecting an execution environment based on the evaluation;
wherein evaluating at least one selection criterion for the plurality of execution environments comprises:
considering a remaining budget from a given quota for a first one of the execution environments; and
selecting the first execution environment as the execution environment for the second virtual computing element to execute the marked code when sufficient remaining budget exists for the first execution environment; and
wherein the steps are performed by at least one processing platform comprising one or more processing devices.

14. The method of claim 13, wherein the step of evaluating at least one selection criterion for the plurality of execution environments further comprises:
considering a remaining budget from the given quota for at least a second one of the execution environments when insufficient remaining budget exists for the first execution environment;
selecting the second execution environment as the execution environment for the second virtual computing element to execute the marked code when sufficient remaining budget exists for the second execution environment; and
defaulting to the first virtual computing element to execute the portion of the marked code when the one or more execution environments specified in the marked code fail to satisfy the at least one selection criterion.

15. An article of manufacture comprising a non-transitory processor-readable storage medium having stored therein program code of one or more software programs, wherein the program code when executed by at least one processing device causes said at least one processing device to perform steps of:
executing a portion of an application program in a first virtual computing element, wherein the application program is decomposed into functions and comprises one or more portions of marked code, the marked code comprising a given function to run in a separate execution environment from the rest of the application program and an environment selection code marker to specify a plurality of execution environments where to execute the given function of the marked code, wherein the plurality of execution environments specified in the marked code comprise a plurality of different pre-configured execution environments for code execution;
receiving a request for execution of one of the one or more portions of marked code;
deciding whether to execute the portion of marked code identified in the request in the first virtual computing element or in a second virtual computing element;
determining an execution environment from the plurality of execution environments specified in the environment selection code marker of the marked code for the second virtual computing element to execute the marked code, when it is decided to execute the portion of the marked code in the second virtual computing element; and
executing the portion of marked code identified in the request;
wherein the step of determining an execution environment from the plurality of execution environments specified in the marked code further comprises:
evaluating at least one selection criterion for the plurality of execution environments and selecting an execution environment based on the evaluation; and
wherein evaluating at least one selection criterion for the plurality of execution environments comprises:
considering a remaining budget from a given quota for a first one of the execution environments; and
selecting the first execution environment as the execution environment for the second virtual computing element to execute the marked code when sufficient remaining budget exists for the first execution environment.

16. The article of claim 15, wherein the step of evaluating at least one selection criterion for the plurality of execution environments further comprises:
considering a remaining budget from the given quota for at least a second one of the execution environments when insufficient remaining budget exists for the first execution environment;

selecting the second execution environment as the execution environment for the second virtual computing element to execute the marked code when sufficient remaining budget exists for the second execution environment; and
defaulting to the first virtual computing element to execute the portion of the marked code when the one or more execution environments specified in the marked code fail to satisfy the at least one selection criterion.

* * * * *